US009838212B2

(12) United States Patent
Moose

(10) Patent No.: US 9,838,212 B2
(45) Date of Patent: Dec. 5, 2017

(54) POE-SYSTEM FOR USE IN AUTOMATION TECHNOLOGY

(71) Applicant: Endress + Hauser GmbH + Co. KG, Maulburg (DE)

(72) Inventor: Donald A. Moose, Indianapolis, IN (US)

(73) Assignee: Endress + Hauser GmbH + Co. KG, Maulburg (DE)

( * ) Notice: Subject to any disclaimer, the term of this patent is extended or adjusted under 35 U.S.C. 154(b) by 204 days.

(21) Appl. No.: 14/935,657

(22) Filed: Nov. 9, 2015

(65) Prior Publication Data

US 2017/0134185 A1 May 11, 2017

(51) Int. Cl.
| H02J 3/14 | (2006.01) |
| H04L 12/40 | (2006.01) |
| H02J 1/00 | (2006.01) |
| H02M 7/02 | (2006.01) |
| H04L 12/10 | (2006.01) |

(52) U.S. Cl.
CPC .......... *H04L 12/40045* (2013.01); *H02J 1/00* (2013.01); *H02M 7/02* (2013.01); *H04L 12/10* (2013.01); *H04L 2012/4026* (2013.01)

(58) Field of Classification Search
None
See application file for complete search history.

(56) References Cited

U.S. PATENT DOCUMENTS

| 6,640,308 | B1 | 10/2003 | Keyghobad | |
| 9,634,858 | B2 * | 4/2017 | Reller | H04L 12/40045 |
| 2006/0218418 | A1 * | 9/2006 | Camagna | H04L 12/10 |
| | | | | 713/300 |
| 2006/0251179 | A1 * | 11/2006 | Ghoshal | H04L 25/0266 |
| | | | | 375/257 |
| 2007/0288125 | A1 * | 12/2007 | Quaratiello | H04L 43/00 |
| | | | | 700/282 |
| 2008/0238447 | A1 | 10/2008 | de la Torre Vega | |
| 2016/0028324 | A1 * | 1/2016 | Weatherspoon | H02M 7/483 |
| | | | | 375/257 |

FOREIGN PATENT DOCUMENTS

WO 0064099 A2 10/2000

OTHER PUBLICATIONS

European Search Report, European Patent Office, Munich, Germany, dated Mar. 31, 2017.

* cited by examiner

*Primary Examiner* — Cassandra Cox
(74) *Attorney, Agent, or Firm* — Bacon & Thomas, PLLC

(57) ABSTRACT

A system for use in automation technology comprising: an Ethernet-enabled field device configured to measure a physical variable, and to generate data representative of the measured physical variable; an Ethernet cable connectable/connected to said field device, wherein said Ethernet cable having PoE (Power over Ethernet) capability so as to both transmit the data from the field device as well as supply power to the field device over the Ethernet cable; and a power sourcing equipment with at least a first output port to which the Ethernet cable is connectable/connected, wherein the power sourcing equipment is arranged so that an input alternating voltage is transformed to a first alternating output voltage, which is provided at the first output port to supply power to the field device over the Ethernet cable.

10 Claims, 2 Drawing Sheets

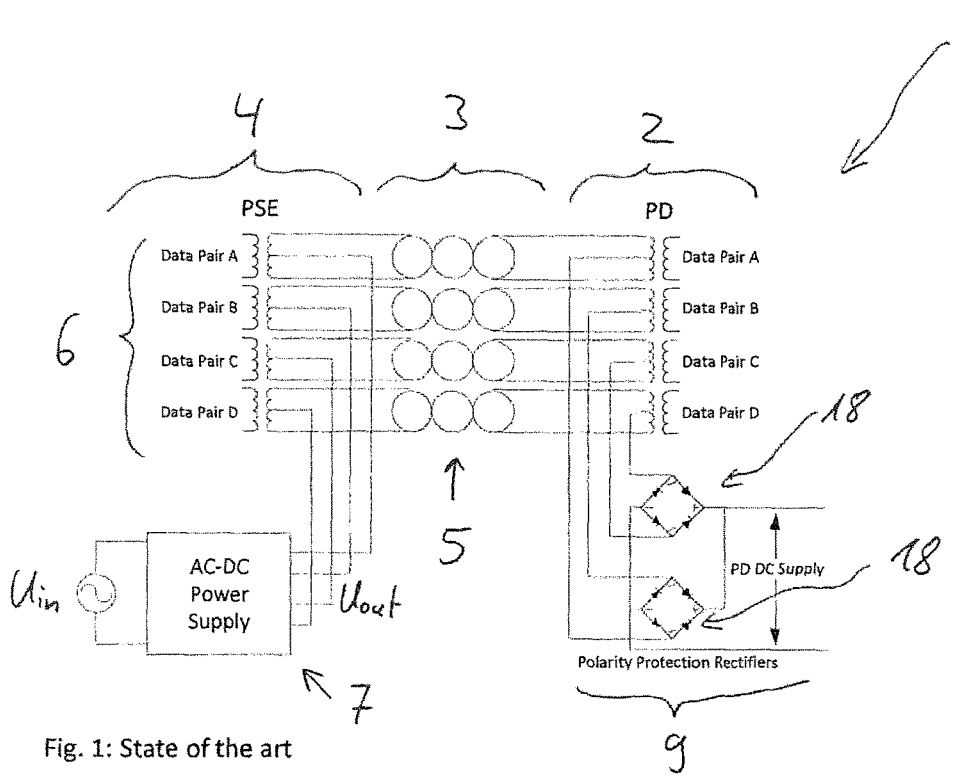
Fig. 1: State of the art
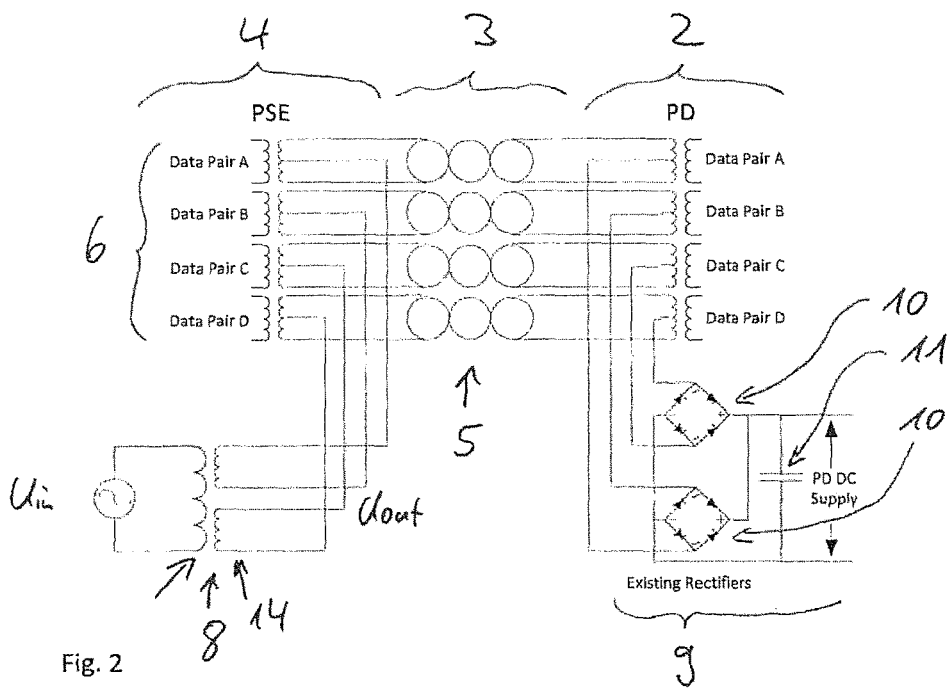
Fig. 2

POE-SYSTEM FOR USE IN AUTOMATION TECHNOLOGY

TECHNICAL FIELD

The invention relates to a system for use in automation technology.

BACKGROUND DISCUSSION

In process automation as well as in manufacturing automation, field devices are often applied, which serve for registering and/or influencing process variables. Serving for registering process variables are measuring devices, such as, for example, fill level measuring devices, flow measuring devices, pressure- and temperature measuring devices, pH-measuring devices, conductivity measuring devices, etc., which register corresponding process variables, fill level, flow, pressure, temperature, pH-value, and conductivity, respectively. Used for influencing process variables are actuators, such as valves or pumps, via which e.g. the flow of a liquid in a pipeline or the fill level of a medium in a container is changed. The terminology 'field devices' in connection with the invention is, thus, intended to include all types of measuring devices and actuators.

Moreover, the terminology 'field devices' in connection with the invention also includes all devices applied near to the process and delivering or processing information relevant to the process. Besides the above mentioned measuring devices/sensors and actuators, also referred to as field devices are generally any units, which are connected directly to a fieldbus and serve for communication with the superordinated unit, thus units such as e.g. remote I/Os, gateways, linking devices and wireless adapters, respectively radio adapters.

A large number of such field devices are produced and sold by the Endress+Hauser group of firms.

In modern industrial plants, communication between at least one superordinated control unit and the field devices occurs, as a rule, via a bus system, such as, for example, Profibus® PA, Foundation Fieldbus® or HART®. Nowadays, the use of standard Ethernet protocols in an industrial environment, as for example in automation or process control, is becoming more and more frequent. For using the Ethernet protocols Ethernet-enabled field devices have been developed, which allow the measured data to be communicated over networks such as Ethernet-based LANs (Local Area Network) or the Internet, so that the data can be monitored and managed online from an also Ethernet-enabled device connected to the Ethernet LAN or the Internet.

Today, the Ethernet-enabled field devices need two independent cables: one for supplying power, and another cable for communicating the data over the Ethernet. However, the installation of the second cable for supplying power can be difficult sometimes and further results in major costs.

Consequently, a technology called Power over Ethernet (hereinafter PoE) has been developed to transmit power over an Ethernet cable to an Ethernet-enabled device. This approach eliminates the need for two independent cables to connect a device to another as well as to deliver power to such a device.

Recently, an IEEE standard has been developed that addresses PoE issues, namely the standard IEEE802.3af, which defines the specification for Ethernet power sourcing equipment and powered devices. The IEEE802.3af standard specs the voltage on the cable, the current on the cable as well as the power on the PoE receiving device. This specification standardized on the use of 48 volts of direct current as the injected PoE voltage.

This technique is limited by DC power losses in the cabling, and complicates galvanic isolation and other safety measures in the field of automation technology.

SUMMARY OF THE INVENTION

It is, therefore, an object of the present invention to improve the PoE technology.

The object is achieved according to the invention by a system for use in automation technology, comprising:
an Ethernet-enabled field device configured to measure a physical variable, and to generate data representative of the measured physical variable;
an Ethernet cable connectable/connected to said field device, wherein said Ethernet cable having PoE (Power over Ethernet) capability so as to both transmit the data from the field device as well as supply power to the field device over the Ethernet cable; and
a power sourcing equipment with at least a first output port to which said Ethernet cable is connectable/connected, wherein said power sourcing equipment is arranged so that an input alternating voltage is transformed to a first alternating output voltage, which is provided at said first output port to supply power to the field device over said Ethernet cable.

The usage of an alternating voltage or AC voltage instead of a DC voltage offers the advantage in allowing longer cables due to lower losses. Moreover, that an AC voltage offers a very simple means of providing galvanic isolation is also an advantage.

In a further development of the invention, the power sourcing equipment further comprises a first voltage transformer to transform the input alternating voltage to the first alternating output voltage.

In a further development of the invention, the alternating input voltage is transformed to the first alternating output voltage with a predetermined frequency. Preferably, is the predetermined frequency at least one of the common alternating voltage supply frequencies of 50, 60 or 440 Hz.

In a further development of the invention, the Ethernet-enabled field device comprises a power input circuit with a rectifier unit and a smoothing element which is placed behind the rectifier unit for smoothing the rectified voltage.

In a further development of the invention, the Ethernet cable comprises at least one of:
a CAT5 cable;
a CAT5e cable; and
a CAT6 cable.

In a further development of the invention, the power sourcing equipment further comprises further galvanically isolated output ports, and wherein the power sourcing equipment is arranged so that the input alternating voltage is transformed to further alternating output voltages, which are provided at the further output ports to supply power to further Ethernet-enabled field devices over further Ethernet cables.

In a further development of the invention, the power sourcing equipment comprises further voltage transformers to transform the input alternating voltage to the further alternating output voltages.

In a further development of the invention, the first voltage transformer is arranged so that the first alternating output voltage is derived by a first secondary winding and the further alternating output voltages are derived by further secondary windings, wherein the first and the further secondary windings are individual arrayed from each other at a core of the voltage transformer.

In a further development of the invention, the Ethernet network is an industrial Ethernet network.

BRIEF DESCRIPTION OF THE DRAWINGS

Other advantages and utilities of the invention will become evident based on the following descriptions of examples of embodiments in reference to the appended drawing, the figures of which show as follows:

FIG. 1 is a Power over Ethernet (PoE) system according to the state of the art;

FIG. 2: is an exemplary system in accordance with an embodiment of the present invention.

DETAILED DISCUSSION IN CONJUNCTION WITH THE DRAWINGS

Figure 3:
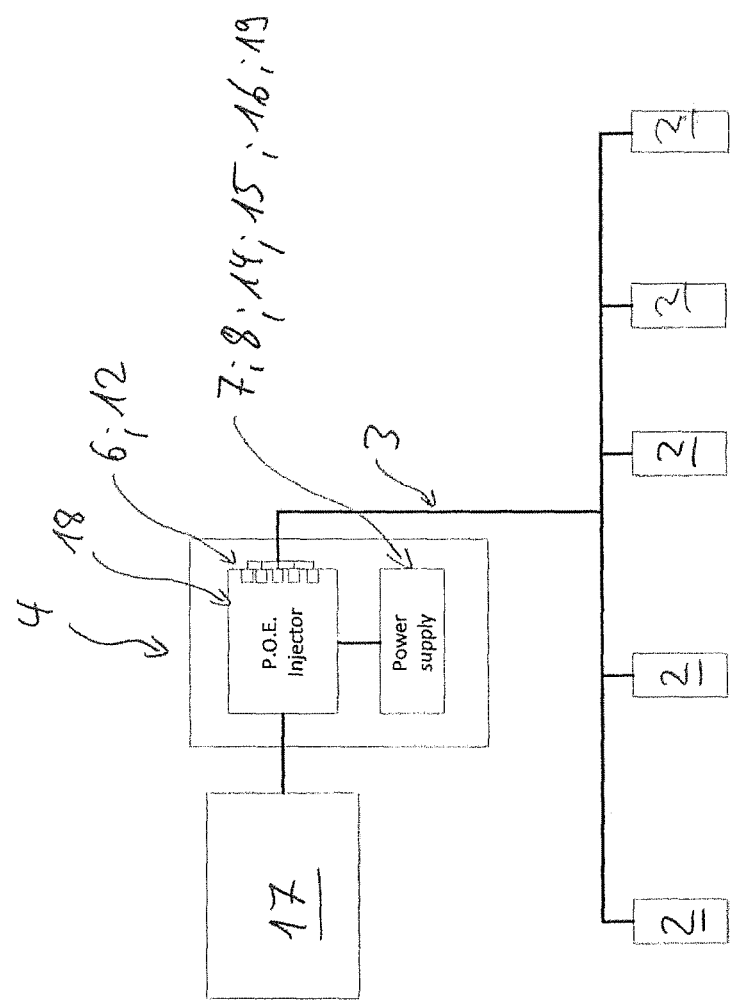
FIG. 3: is a block diagram of a process control or monitoring system with which embodiments of the present invention are particularly useful.

FIG. 1 shows a state of the art Power over Ethernet (PoE) system 1 according to the standard IEEE 802.3at/af. The IEEE standard has been developed in recent years and defines the specification for Ethernet power sourcing equipment 4 and powered devices 2. The IEEE802.3af standard specifies the voltage on the cable, the current on the cable as well as the power on the PoE receiving device. This specification standardized on the use of 48 volts of direct current as the injected PoE voltage.

The system 1 according to the state of the art comprises an Ethernet-enabled device 2, e.g. an Ethernet-enabled field device, which is configured to measure a physical variable, such as pressure or fill level, and to generate data representative of the measured physical variable.

The system 1 further comprises an Ethernet cable 3 which is configured to transmit data from the field device 2 over an Ethernet network and power to the field device 2 from a power sourcing equipment 4.

Thus, the Ethernet cable 3 might be a CAT5, a CAT5e or a CAT6 cable, which provide Power over Ethernet capabilities. However, any one of available Ethernet cables which provides this capability can be used.

As can be seen in FIG. 1, there are eight wires inside the Ethernet cable 3. These wires are twisted into 4 pairs of wires as indicated in FIG. 1 using reference numerals 5. Typically a Registered Jack (RJ45) connector is used in combination with the Ethernet cable 3.

The system 1 according to the state of the art further comprises a power sourcing equipment 4 with a first output port 6 and a first AC/DC power supply 7. The AC/DC power supply 7 is connected to the first output port 6, wherein the first output port 6 is galvanically isolated due to the usage of a standard PoE-compatible 10/100/1000 Ethernet isolation transformer. In a non-PoE system, this transformer provides galvanic isolation between network nodes, and with each port having its own isolation transformer, individual devices are automatically isolated from one another. The important thing to note about any Ethernet-connected system is that Ethernet is point-to-point, thus there are exactly two ends to an Ethernet link. As a consequence each powered device is connected to a separate port on the power sourcing equipment, thus isolating each port in an industrial/instrumentation setup requires a separate isolated AC/DC power supply.

As easily can be seen in FIG. 1, the power supply transforms an alternating input voltage $U_{in}$ (AC voltage) into a direct current voltage $U_{out}$ (DC voltage), which is supplied via the first output port 6 to the device 2 over the Ethernet cable 3 for power supply.

Since the already mentioned IEEE802.3af standard allows either polarity to be used, a power input circuit 9 inside the device 2 is necessary. Typically the power input circuit 9 comprises two diode bridges 18 to ensure an expected DC output polarity for arbitrary DC input polarity.

FIG. 2 shows an exemplary system in accordance with an embodiment of the present invention. The system for use in automation technology comprising an Ethernet-enabled field device 2 configured to measure a physical variable, and to generate data representative of the measured physical variable, an Ethernet cable 3 connected with its first end to said field device 2, and a power sourcing equipment 4 with a first output port 6 to which the Ethernet cable 3 is connected with its second end.

The power sourcing equipment 4 according to the invention includes a first voltage transformer 8, which is connected to the first output port 6 with its second side. The voltage transformer 7 transforms an alternating input voltage $U_{in}$ (AC voltage) to a first alternating output voltage $U_{out}$ (AC voltage), preferably with a predetermined frequency in the range of about 50 to 60 Hertz (Hz). The predetermined frequency might be also higher, as for example 440 Hz. However, any substantially similar arrangement at any other practical frequency can be also used. The higher frequency results in a smaller core of the voltage transformer 8, as one of the basic rules of power magnetics, especially voltage transformers, is that the higher the frequency of operation, the smaller a core must be to minimize losses.

Preferably the power sourcing equipment 4 comprises further isolated output ports 12 to which further Ethernet-enabled field devices 2 are connectable via further Ethernet cables 3, as illustrated in FIG. 3. These further output ports 12 are each galvanically isolated by providing each port a separate power transformer secondary winding 15. Alternatively each port is connected to a separate voltage transformer.

Moreover, the Ethernet-enabled field device 2 comprises a power input circuit 9 with a rectifier unit 10 and a smoothing element 11, which is placed behind the rectifier unit 10 for smoothing the rectified voltage. Preferably, at least the two diode bridges, which typically every PoE device has implemented as polarity protection, are used for the rectifier unit 10. As smoothing element 11 typically a capacitor is used.

FIG. 3 illustrates a simplified block diagram of a process control or monitoring system having a plurality of field devices 2. At this point, it needs to mention that the invention is not restricted to a specific number of field devices.

The process network comprises a control or monitoring system 17 with an operator interface (such as a user workstation or computer), which can be coupled through a Power over Ethernet injector 18 (PoE injector) via Ethernet cable 3 to one or more of field devices 2. PoE injector 18 receives power from power supply 19 and places an alternating voltage potential on one or more pairs of wires within the Ethernet cabling.

Each field device 2 is preferably adapted to derive operating power from the alternating voltage potential on the Ethernet cable 3. Power can be delivered on the same cable as Ethernet communications. The Ethernet cable can be, for example, a CAT5 cable. However, the Ethernet cable might be a CAT5e or a CAT6 cable as well.

What is claimed is:

1. A system for use in automation technology, comprising:
   an Ethernet-enabled field device configured to measure a physical variable, and to generate data representative of the measured physical variable;
   an Ethernet cable connectable/connected to said field device, wherein said Ethernet cable having PoE (Power over Ethernet) capability so as to both transmit the data from said field device as well as supply power to said field device over the Ethernet cable; and
   a power sourcing equipment with at least a first output port to which said Ethernet cable is connectable/connected, wherein;
   said power sourcing equipment is arranged so that an input alternating voltage is transformed to a first alternating output voltage, which is provided at said first output port to supply power to said field device over said Ethernet cable.

2. The system of claim 1, wherein:
   said power sourcing equipment further comprises a first voltage transformer to transform said input alternating voltage to said first alternating output voltage.

3. The system of claim 1, wherein:
   said alternating input voltage is transformed to said first alternating output voltage with a predetermined frequency.

4. The system of claim 3, wherein:
   said predetermined frequency is at least one of the common alternating voltage supply frequencies of 50, 60 or 440 Hz.

5. The system of claim 1, wherein:
   said Ethernet-enabled field device comprises a power input circuit with a rectifier unit and a smoothing element which is placed behind said rectifier unit for smoothing the rectified voltage.

6. The system of claim 1, wherein:
   said Ethernet cable comprises at least one of: a CAT5 cable; a CAT5e cable; and a CAT6 cable.

7. The system of claim 1, wherein:
   said power sourcing equipment further comprises further output ports, preferably galvanically isolated output ports; and
   said power sourcing equipment is arranged so that said input alternating voltage is transformed to further alternating output voltages, which are provided at said further output ports to supply power to further Ethernet-enabled field devices over further Ethernet cables.

8. The system of claim 7, wherein:
   said power sourcing equipment comprises further voltage transformers to transform said input alternating voltage to said further alternating output voltages.

9. The system of claim 1, wherein:
   said first voltage transformer is arranged so that the first alternating output voltage is derived by a first secondary winding and said further alternating output voltages are derived by further secondary windings, wherein said first and said further secondary windings are individually arrayed from each other at a core of said voltage transformer.

10. The system of claim 1, wherein:
    said Ethernet network is an industrial Ethernet network.

* * * * *